Sept. 23, 1958  J. A. HALGREN  2,853,328
MEANS AND METHOD FOR STRENGTHENING SHOULDERED ASSEMBLIES
Filed May 26, 1954

DISTANCE IN INCHES
FROM CYLINDER AXIS

DISTANCE IN INCHES
FROM CYLINDER AXIS

INVENTOR
JOHN A. HALGREN

Paul O. Pippel
ATTY.

United States Patent Office 2,853,328
Patented Sept. 23, 1958

2,853,328

MEANS AND METHOD FOR STRENGTHENING SHOULDERED ASSEMBLIES

John A. Halgren, Downers Grove, Ill., assignor to International Harvester Company, a corporation of New Jersey Application May 26, 1954, Serial No. 432,564

1 Claim. (Cl. 287—117)

This invention relates to an improved means and method of manufacturing shouldered assemblies. More specifically, the invention relates to an improvement in connecting metal parts, one of the parts having mating relation with respect to the other part.

In certain machine-component assemblies, it is required that one part be provided with a shoulder and a reduced diameter portion, the said part being connected to a second part having an open-end bore with the reduced diameter in mating relation within said bore. This type of connection generally is found in screw-type connections, press-fit connections, and other assemblies wherein the reduced diameter portion of a shouldered assembly engages the bore of another part in telescoping securing relation. In the conventional joining of these parts, it is customary to provide a chamfer around the portion of the part which is immediately disposed adjacent the open end of the bore. On the other hand, a fillet is provided at the point wherein the reduced diameter portion is joined to the shoulder portion. This is adequately illustrated by conventional bolt and nut assemblies, wherein the nut is provided with a chamfer and the bolt is provided with a fillet radius at the point of connection of the head of the bolt to the reduced diameter body of the same. In practice, it has been deemed desirable to make the fillet of smaller radius than the chamfer. In this manner, when the parts are placed into securely fastened relation, the chamfer portion does not in any way interfere with the reduced radius fillet. Since there is no contact at this point, therefore, it has been the thought that the fatigue life of the assembled parts could be increased. This, however, is not the case; and it is a prime object of this invention, therefore, to provide an improved method and means for joining a shouldered part to another part having a bore, the said means and method providing for increased strength in the final assembly.

Another object is to provide an improved article assembly, wherein one part is provided with a shoulder and a reduced end portion and a second part is provided with a bore having a chamfer at one end, the parts being tightly connected in assembly and having chamfer and fillet portions engaging one another in interference-fit relation.

Still another object is to provide an improved method and means for strengthening shouldered assemblies, the assembly comprising a first member having a bore with a small radius chamfer, the assembly further including a second member having a reduced diameter portion connected to an enlarged shoulder with a larger radius fillet portion disposed adjacent the point of connection of the reduced diameter portion to the shoulder; whereupon joining of said first and second members, the fillet engages the chamfer in interference-fit relation whereby the portions of the members adjacent the fillet and chamfer are placed in large compressive-stress relation, so that the resultant compressive stresses are highly beneficial in strengthening the parts in the assembly.

A still further object is to provide a large fillet radius on a part adapted to be mated with another part having a bore, the two parts being placed into axial compression so that an interference fit is provided between the fillet on the one part and a chamfer on the other, causing work hardening of the chamfer and fillet and creating compressive stresses in the area surrounding the fillet and the chamfer whereby strengthening of the assembly is accomplished.

These and other objects will become more readily apparent from a reading of the specification when examined in connection with the accompanying sheet of drawing.

Figure 1:
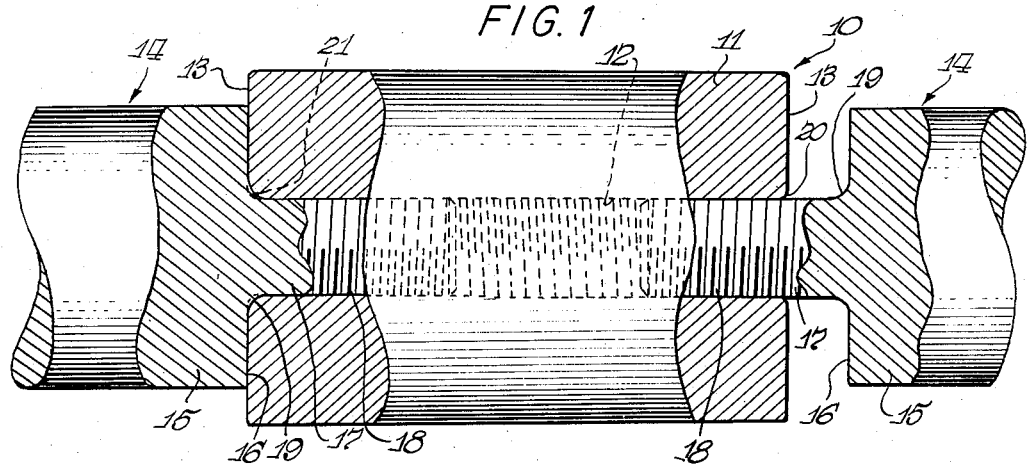
Figure 1 is a side-elevational view of a shouldered assembly having portions of the view broken away to illustrate the pertinent features of the invention.

The assembly shown in Figure 1 is what may be called a shouldered assembly. In definition, a shouldered assembly is considered one wherein a first part is provided with a longitudinally extending bore which may be open at one or both ends. In this assembly, a second part is provided with a shoulder and a reduced end or diameter portion which is adapted to fit into the open-end bore in mating relation with the shoulder, the shoulder also tightly engaging a surface of the first part which is disposed angularly or laterally with respect to the axis of the first part. By this definition it can be seen that screws, bolts, and similar parts are included in this category, parts of this type generally being subjected to high bending and tensional stresses. The general assembly shown in Figure 1 is designated at 10. The assembly 10 comprises a first part 11 having an axially extending bore 12. The part 11 is provided with end surfaces 13 which are disposed generally, laterally with respect to the axis of the part.

A second part, or member, is generally designated at 14. This part comprises an enlarged shoulder 15 having an end surface 16 disposed laterally with respect to the axis of the part 14. Integrally joined to the end surface 16 and the part 15 is a reduced diameter portion 17. The reduced diameter portion 17 is threaded, as indicated at 18, so that the part 15 may be tightly screwed into the bore 12 which is also threaded. In the assembly shown in Figure 1, two parts 14 are shown to better illustrate the invention, and, of course, like reference characters have been applied.

At the point of connection of the reduced diameter part 17 to the shoulder 15, a fillet 19 is provided. The fillet 19 is annular extending completely around the pheriphery of the reduced diameter part 17 at the juncture of the same to the shoulder 15. The fillet 19 has a considerably large radius surface. At the outer ends of the bore, a chamfer 20 is provided on the part 11, this chamfer being disposed immediately adjacent the end walls 13 of the member 11. The chamfer 20 is of a substantially smaller radius than the fillet portion 19, the said chamfer 20 also extending completely around the opening of the bore 12.

As shown in Figure 1, the part 15 on the left has its reduced diameter portion 17 tightly screwed into the bore 12. The surface 16 of the part 15 is tightly up against the surface 13. Since the fillet 19 has a considerably larger radius than the chamfer 20, the said fillet 19 interferes, or provides interference, with the chamfer 20. As best shown at the left-hand portion of Figure 1, the fillet is wedged against the chamfer, which before tightening of the assembly was at the position indicated by the dotted lines at 21; and by tightly screwing the parts together, compressive stresses are set up in the material adjacent the fillet portion and the chamfer portion and in the surrounding area of the metal.

The right-hand portion of assembly shown in Figure 1 shows the size of the fillet 19 and its relationship to the size of the chamfer 20. By tightening the parts together, work hardening takes place in the chamfer and in the fillet, due to the interference of the two portions. Thus, at this point large compressive stresses are created in the metal, and the resultant complete assembly is stronger and is less likely to break down due to fatigue failure. By making the fillet which joins the reduced diameter portion to the shoulder larger than the chamfer on the mating part, the assembly is also strengthened due to the compressive stresses which are created within the metal parts, and the work hardening which takes place due to the interference fit. It is, of course, realized that the invention pertains to those assemblies in which there are sufficient forces pressing the shoulder against the mating part to maintain intimate contact of the fillet and chamfer during application of service loads.

It is well known in metallurgy that the presence of residual tensile stresses at the surface of metallic shapes is, in general, deleterious, and that the reduction of such stresses, or the conversion of such stresses to compressive stresses, is thus highly beneficial in improving the performance of the connected parts. In other words, greater strength in the assembly results by placing the heavily stressed parts in compression, rather than have tensile stresses at these particular points. Generally, in the manufacture of certain parts, where it is desired to secure compressive stresses, the desired stresses can be secured by surface rolling, surface drawing, shot peening, and other methods. These methods recognize the effectiveness of compressive stresses, as against residual tensile stresses. However, these methods are expensive, and effective strengthening of shouldered assemblies can be simply and cheaply accomplished by mating the parts, as indicated, and by making the fillet radius larger than the radius of the chamfer. Fatigue life, and particularly bending of such parts, may be thus increased by one hundred to three hundred per cent.

Figure 2:
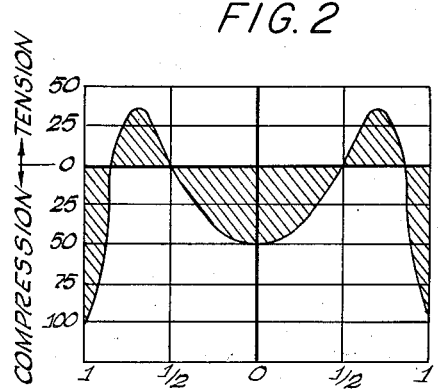
Figure 2 is a chart graphically showing the compressive and tension stresses in a longitudinal direction of the assembly shown in Figure 1.

Figure 2 shows a graphic illustration of the compressive and tension stresses in a longitudinal direction in the parts after they are assembled. At zero inches from the cylinder axis, compressive stresses in a longitudinal direction are considerable up to a distance of one-half an inch from the cylinder axis. Up to one-half inch, then, from the cylinder axis on each side, the residual tension stresses are at a minimum, and thus a very desirable situation is achieved. Again, at a distance approximately one inch from the center or cylinder axis of the assembled parts, high compressive stresses are encountered which again are very desirable. These stresses that are near the surface are most important, and it should be noted that they are desirably compressive. It is noted also that the tension stresses are prevalent from one-half inch from the center of the axis up to approximately three-quarters of an inch from the axis. However, since these are near the center, they are not extremely detrimental.

The longitudinal compressive stresses, therefore, in a test specimen are very favorable when the structure and process of the invention are utilized. The designations from zero to one hundred on the graph may be considered as figures indicating percentage, or they may be figures merely set forth to show relative comparisons of the diameter portion 17 from its longitudinal axis to its outer diameter surface.

Figure 3:
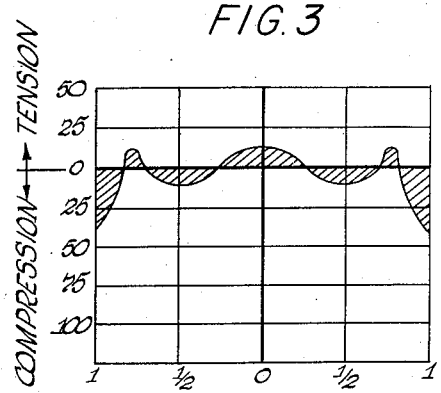
Figure 3 is a chart graphically showing the compressive and tension stresses in a tangential direction of a shouldered assembly shown in Figure 1.

In Figure 3, the same test specimen of a complete assembly (which may be a test specimen arbitrarily chosen from many during the testing or manufacture of these units), the compressive and tension stresses are shown, these stresses being in a tangential direction with respect to the cylinder axis of the assembly. Here we find tension stresses prevalent from the cylinder axis up to approximately one-quarter of an inch on each side of the axis. At one-half inch on each side of the cylinder axis, the compressive stresses are favorable; and at one inch from the cylinder axis, the compressive stresses have become considerably more favorable. This indicates a favorable condition with very small tension stresses in the part in the region of the fillet and chamfer. It must be understood, of course, that various variations may occur in various test specimens, and the graphic example shown in Figures 2 and 3 may vary considerably. However, in general, it has been found that the shouldered assemblies are greatly strengthened, the fatigue failures are much less numerous, and better all-around performance is gained by this process and assembly.

Thus the objects of the invention have been fully achieved, and an improved strengthened shouldered assembly has been described. It must be understood that changes and modifications may be made without departing from the spirit of the invention as disclosed or the scope thereof as defined in the appended claim.

What is claimed is:

An article of manufacture comprising a first metal member having an open-end bore, a chamfer on said first member around the open end of said bore, said chamfer having a small radius surface, a second metal member having a reduced diameter portion and an enlarged shoulder connected thereto, a fillet portion having a larger radius than the radius of said chamfer, at the point of connection of said shoulder to said reduced diameter portion, means on said first and second members interconnecting said members whereby said reduced diameter portion engages said bore in mating relation and said chamfer and fillet are tightly engaged whereby said fillet portion, chamfer and adjacent portions thereof are placed into relative compressed relation to provide compressive stresses in said members.

References Cited in the file of this patent

UNITED STATES PATENTS

| | | |
|---|---|---|
| 528,320 | Berridge | Oct. 30, 1894 |
| 1,477,855 | Thurston | Dec. 18, 1923 |
| 1,794,410 | Kocourek | Mar. 3, 1931 |

FOREIGN PATENTS

| | | |
|---|---|---|
| 238,593 | Great Britain | Aug. 17, 1925 |